United States Patent [19]

Bachelard et al.

[11] 4,151,000

[45] Apr. 24, 1979

[54] ANHYDRITE BINDER AND METHOD

[75] Inventors: Roland Bachelard, Lyons; Robert Barral, Saint Symphorien; Maurice Lamalle, Saint-Genis-Laval; Robert Koeppel, Bron, all of France

[73] Assignee: Produits Chimiques Ugine Kuhlmann, Paris, France

[21] Appl. No.: 891,836

[22] Filed: Mar. 30, 1978

Related U.S. Application Data

[63] Continuation of Ser. No. 756,861, Jan. 4, 1977, abandoned.

[30] Foreign Application Priority Data

Jan. 13, 1976 [FR] France ................... 76 00678

[51] Int. Cl.$^2$ ............................................. C04B 11/06
[52] U.S. Cl. ..................................... 106/109; 423/555
[58] Field of Search ................. 106/109, 111, 315; 423/167, 171, 172, 555

[56] References Cited

U.S. PATENT DOCUMENTS 3,872,204  3/1975  Yano et al. ......................... 106/315

Primary Examiner—James Poer
Attorney, Agent, or Firm—Pennie & Edmonds

[57] ABSTRACT

The present invention relates to an anhydrite binder and to the method of making the same from the gypsum by-product (phosphogypsum) resulting from the production of phosphoric acid by the wet method, said binder comprising particulate anhydrous $CaSO_4$ with an insoluble $CaSO_4$ content of at least 93%, an average particle size diameter of 5 to 30, with 15% by weight or more of the particles having a diameter smaller than $10\mu$ and 20% by weight or more of the particles having a diameter larger than $20\mu$, and a pore volume of less than 0.29cc/g in the case of pores having a radius less than about $6.6\mu$.

7 Claims, No Drawings

ANHYDRITE BINDER AND METHOD

This is a continuation of application Ser. No. 756,861, filed Jan. 4, 1977, now abandoned.

BACKGROUND OF THE INVENTION

The gypsum by-products derived from the production of phosphoric acid by the wet method and having the formula $CaSO_4.2H_2O$ still constitute little used products which pose serious ecological problems. The production of phosphogypsum in phosphoric acid plants employing the wet method (action of sulfuric acid on phosphate rock) is increasing by hundreds of tons daily, and it is no longer possible for ecological reasons to continue dumping it into the sea or into rivers as has hitherto been the case. Moreover, storage of this product in dumps, as is currently practiced by numerous firms, also poses problems which are insurmountable in the long term.

Much research has been directed to the study of phosphogypsums in an effort to process from them raw materials having an intrinsic value.

Most of this research has been directed to the preparation, by more or less extensive dessication, of different types of plasters such as the semi-hydrates or more recently the hemi-hydrates, $CaSO_4.\frac{1}{2}H_2O$, of the $\alpha$ hard-plaster variety or the $\beta$ flowable plaster of Paris variety and the anhydrous rehydratable $CaSO_4$ varieties such as hydraulic plasters.

On the other hand, there has been much less research into the anhydrous forms of $CaSO_4$ which are non-rehydratable after calcination, as these products were considered as having virtually no industrial importance.

SUMMARY OF THE INVENTION

There has now been developed a particularly important and novel type of anhydrous $CaSO_4$ which can be used to produce binders for the preparation of products having a high mechanical resistance and intended for use in place of conventional cements for all applications where the prepared coatings or surfacings are not in permanent contact with water or moisture.

The anhydrite bonding agent according to the invention comprises an anhydrite binder consisting of particulate anhydrous $CaSO_4$ having an insoluble $CaSO_4$ content of at least 93%, an average particle size diameter of 5 to 30$\mu$ with 15% by weight or more of the particles having a diameter smaller than 10$\mu$ and 20% by weight or more of the particles having a diameter larger than 20$\mu$, and a pore volume of less than 0.29 cc/g in case of pores having a radius less than about 6.6$\mu$. The invention also comprises the method of making such binders as hereinafter described.

DETAILED DESCRIPTION

The anhydrites of the present invention are prepared directly from phosphogypsums produced in the manufacture of phosphoric acid by the wet method. Such phosphogypsums are produced by the action of sulfuric acid on the fluoropatitic phosphofluoric minerals and no pretreatment is necessary as in the case of the processes currently employed for preparing plaster-type gypsum derivatives.

The starting products which are derived from the manufacture of phosphoric acid by the wet method are in the form of crystals collected in the breaker head (term of the art with respect to apparatus used in the wet process). The granulometry of the crystals is such that their size is between 2 and 350$\mu$ and the average diameter, i.e., the diameter which is such that 50% by weight of the product is on each side of this value, is on the order of 30$\mu$. This phosphogypsum generally has a fairly constant diameter as it is filtered continuously during the manufacture of phosphoric acid. Its composition varies slightly according to the phosphates employed, but this does not affect its preparation and features of use in accordance with the present invention.

Research on the present invention has been based essentially on the use of a phosphogypsym having the following chemical composition after being dried at 80° C. at a constant weight:

| | |
|---|---|
| $CaSO_4 . 2H_2O$ | 95–96% |
| Fluorine | 0.9–1.1% |
| $SiO_2$ | 0.7–0.9% |
| $Fe_2O_3$ | 0.15–0.30% |
| $Al_2O_3$ | 0.20–0.40% |
| $P_2O_5$ (water-soluble) | 0.09–0.11% |
| $P_2O_5$ (insoluble) | 0.4–0.6& |

The conversion of phosphogypsum into an anhydrite binder of the instant invention can be effected from phosphogypsum which is either obtained directly from the phsophoric acid preparation plant or from a stored product and comprises the following essential steps:

(a) calcination at a temperature of 450° C. to 1,200° C. and preferably 800° C. to 1,100° C. with the calcination being continued until the calcined granulated product has a pore volume of less than 0.25 cc/g in the case of pores having a radius smaller than 6.6$\mu$ and a granulometry which corresponds at least to the granulometry of the starting phosphogypsum; the product obtained at this stage is partially sintered and is friable, but is totally inactive, i.e., it is not rehydratable, and (b) the second step consisting of a fine grinding operation which is regulated so as to obtain a product having a granulometry comprising at least 15% by weight of fine particles having a diameter smaller than 10$\mu$ and at least 20% by weight of particles having a diameter larger than 20$\mu$, with an average particle diameter of 5 to 30$\mu$.

The product thereby obtained which comprises at least 93% insoluble $CaSO_4$ and has a pore volume of less than 0.29 cc/g in the case of pores having a smaller radius than 6.6$\mu$ is easy to handle. It can thus be packed or delivered in bulk to the user. It has also returned to the hydratable state and can be used to prepare good quality anhydrite binders. These can be used in place of conventional cements for all applications where the coatings or coverings prepared are not in direct contact with water or moisture. The particular advantages of the products are their good fluidification properties and their low mixing water requirement.

Calcination of the phosphogypsum can take place in all types of furnaces such as rotating furnaces, tunnel furnaces, electric furnaces, blast furnaces, but the use of conventional rotating furnaces has proved especially advantageous. The length of the calcining process varies with the temperatures. When a rotating furnace is used at temperatures of 800° C. to 1,100° C. residence times of 1 to 2 hours are sufficient to obtain a calcined phosphogypsum having the requisite properties. As an example, the capacity of a fuel-heated rotating furnace which is 30 meters in length and 3 meters in diameter and equipped with a refractory lining is approximately 10 tons per hour.

The calcined phosphogypsum can be ground after storage in a single operation or preferably in a double operation. In the latter case, the calcined product is first crushed in a jaw type or cylinder grinder. It is then supplied to a ball mill or Forplex pin grinder and ground to the desired granulometry. The fineness of the grinding operation and simultaneous presence of fine grains and larger grains is essential to regulate the setting rate of a rapid setting cement product requiring very little mixing water.

The use of a ball mill is especially advantageous as it enables the activators required in the preparation of anhydrite bonding agents from the anhydrite binder to be introduced directly into the ball mill during the grinding operation.

To provide the anhydrite with suitable properties for the preparation of mortar, it is necessary to add small quantities of products known as activators to the anhydrites. The purpose of the activators is to increase the rehydration rate of the anhydrite while retaining the mixing water sufficiently long to prevent it from evaporating before sufficient hydration of the anhydrite. The activators can be added to the phosphogypsum before calcination, after calcination, or during grinding by adding them in the dry state or dissolved state or in suspension in the mixing water. The phrase "anhydrite bonding agent" is used herein to mean the mixture of activator and anhydrite of the present invention.

It is necessary to add 0.5 to 4% of the activators, based on the weight of the anhydrite. Examples of suitable activators include mineral agents such as sulfates, alkaline earth oxides and hydroxides, alkaline silicates, used either separately or in combination. The use of mixtures of potassium sulfate and slaked lime as activators has proved especially advantageous as the pastes produced with these elements when mixed with water possess both a rapid setting rate and good plasticity while eliminating the risk of releasing sulfurated hydrogen through hydrolysis of calcium sulfide during mixing.

The addition of fluidifying resins such as the alkaline salts of fulfonated styrene or substituted styrene polymers or copolymers, described in copending application Ser. No. 621,353, filed Oct. 10, 1975, and incorporated herein by reference, in amounts of 0.01 to 10% also enables the anhydrite according to the invention to be used for producing rapid setting self-smoothing coatings having only minimal sweating characteristics and good mechanical properties.

The anhydrite bonding agents prepared from the anhydrite produced by this invention are characterized upon use by certain advantageous properties.

At the normal mixing consistency, they possess a water content of less than 30% measured according to NF P15-402. This is an especially low water content. By comparison, flowable plasters have a normal mixing consistency of up to 80%. That of overburned plasters is approximately 40% and that of Portland cements, which is variable according to their composition, is currently 40%. The stoichiometric water absorption of anhydrite $CaSO_4$ to form $CaSO_4.2H_2O$ is 26%.

The time taken for the bonding agent according to the invention to begin to set after activation with 1% $K_2SO_4$ and 1% $Ca(OH)_2$ is from 20 minutes to 1 hour 30 minutes. It is in excess of 30 minutes in the case of Portland cements and 1 to 6 minutes in the case of plasters.

The anhydrite bonding agent according to the invention can be fluidified without a large amount of water. By adding 1% of the fluidifying resin described above, a paste is obtained which is capable of flowing at the rate of 30 kg/hxcm$^2$ through a circular orifice with a quantity of water which does not exceed by 3 points the water content at normal mixing consistency.

The products obtained possess good mechanical properties capable of satisfying the requirements of the building industry. For example, a bonding agent prepared from the subject anhydrite which is used without a fluidifying agent but with 1% $K_2SO_4$ and 1% $Ca(OH)_2$ as activators produces the following results by comparison with anhydrite bonding agents according to German standard DIN 4208.

| | Anhydrite bonding agents according to the invention | | Anhydrite bonding agents as defined by DIN 4208 | | | | | |
|---|---|---|---|---|---|---|---|---|
| | | | AB 50 | | AB 125 | | AB 200 | |
| | 7 days Min. | 28 days Values | 7 days | 28 days | 7 days Min. | 28 days Values | 7 days | 28 days |
| Tensile strength according to NF P 15–451... kg/cm$^2$... | 40 | 80 | 15 | 35 | 30 | 50 | 40 | 80 |
| Compression strength according to NF P 15-451 kg/cm$^2$... | 200 | 400 | 50 | 150 | 150 | 250 | 200 | 400 |
| Rockwell hardness according to ASTM E 18 method A - Scale R | 70 | 85 | — | — | — | — | — | — |

The non-limitative examples provided below serve to illustrate the anhydrite and anhydrite bonding agents according to the invention as well as the mortars prepared from these bonding agents.

EXAMPLE 1

A phosphogypsum having the following average composition is taken from a dump:

| | |
|---|---|
| Water | 13.5% |
| $CaSO_4 . 2H_2O$ | 83.0% |
| F | 0.85% |
| $SiO_2$ | 0.70% |
| $Fe_2O_3$ | 0.20% |
| $Al_2O_3$ | 0.25% |
| $P_2O_5$ (water-soluble) | 0.09% |
| $P_2O_5$ (insoluble) | 0.45% |
| Various other elements such as Na - MgO | <1% |

The product is in the form of a pulverulent material having the following granulometric characteristics:
Average diameter: 32 microns
20% by weight: larger than 60 microns
20% by weight: smaller than 12 microns It is deposited on Inconel trays in layers 2 cm. deep. When these trays have been filled, they are inserted in an electric furnace which is initially at ambient temperature.

After a constant air flow rate has been established inside the furnace the heating operation is commenced. A substantially linear temperature rise enables the temperature to reach 885° C. after 12 hours. The product is kept at this temperature for ½ hour and then the heating operation is interrupted and the furnace opened. The temperature drops rapidly and reaches 350° C. 3 hours after termination of heating. The product is allowed to cool slowly until it can be recovered.

A pinkish-beige product is obtained. It is in the form of friable agglomerates which can be reduced to powder form simply by manual stirring.

When examined by X-ray diffraction, the solid will be found to consist exclusively of insoluble ($CaSO_4\beta$) anhydrite.

Granulometric analysis produces the following results:
Average diameter: 38 microns
20% by weight: larger than 66 microns
20% by weight: smaller than 14 microns The pH of an aqueous 10% suspension of this anhydrite is slightly basic.

The product is then subjected to the following tests for bonding agents:

1. Determination of the water content at normal consistency.

29.5% is determined according to NF P 15 402

2. Measurement of the setting rate with a Vicat needle.

Measured according to NF P 15 431
The anhydrite mixed with 29.5% of its weight with water in which 1% of its weight in $K_2SO_4$ has been dissolved begins to set after 6 hours. Setting is terminated 10 hours after mixing.

3. Measurement of the mechanical resistances of pure paste.

Measured according to NF 15-451.
The results are the averages of five tests to determine the tensile strength and of ten tests to determine compression strength. The following values were obtained:

|  | Values After | |
| --- | --- | --- |
|  | 7 days | 28 days |
| Tensile strength kg/cm² | 65 | 70 |
| Compression strength kg/cm² | 232 | 313 |

4. Rockwell Hardness

Measured in accordance with ASTM E 18 (method A, scale R).
A 7 days: 71
A 28 days: 84

4. Fluidification Test

This test was carried out by the applicant to evaluate the anhydrite bonding agents when they are used, for example, to pour surfacings. In this case, it is especially advantageous to be able to prepare a paste having sufficient fluidity for it to flow through a pump and for it to be self-spreading and self-leveling. This considerably reduces the clean-up work required and lowers labor costs.

Fluidification of anhydrite mixed with water is obtained by adding thereto small quantities of specific resins of the types claimed in U.S. application Ser. No. 621,353. The test consists in measuring the flow rate of the paste flowing through a calibrated orifice disposed at the lower end of a 250 ml. pouring container filled with anhydrite and water. It also contains fluidifying resin at a ratio of 1% by weight of the calcium sulfate employed.

The fluidity is satisfactory when the flow rate reaches 30 kg/hxcm².

It is obviously always possible to reach this value by merely adding sufficient water. However, if the amount of water is excessive the mechanical properties will be adversely affected. We have set the limits for the amount of water at 3 points above the normal consistency.

In the example described, the fluidity of the paste obtained by mixing an anhydrite with a maximum of 32.5% water and 1% resin is virtually 0. Although it possesses excellent bonding properties and is superior, for example, to the AB 125 variety of anhydrite bonding agents as defined by German Standard DIN 4208, the product as prepared above can be considered inadequate.

EXAMPLE 2

The phosphogypsum in Example 1 is removed from a dump by a machine which is used to supply a continuous proportioning device. After being transported on a conveyor belt, it is conveyed in transit by a hopper used upstream of a rotating furnace. The furnace is 30 meters in length and has a diameter of 3 meters. It consists of a metal sheating internally equipped with a refractory brick lining. It is heated by a fuel burner located on the axis of the furnace at the product discharge point and has a flow rate of 400 liters/fuel hour.

The phosphogypsum which enters at 10 tons per hour comes into contact with the combustion gases which are discharged at a temperature of approximately 450° C. As it passes through the furnace, it reaches a maximum temperature of approximately 900° C. and then cools down substantially in the last part of the furnace.

The sulfate is discharged at approximately 750° C. in the form of anhydrite approximately 1 hour after being introduced into the rotary furnace.

After cooling the anhydrite is coarsely ground and then sieved. The particles obtained have the following granulometric characteristics:
Average diameter: 60 microns
20% by weight: larger than 105 microns
20% by weight: less than 23 microns This product has a water content at normal consistency of 22%. Mixed with 1% $K_2SO_4$ it sets slowly:
commencement of setting: 7 hours
termination of setting: 10 hours The mechanical resistances measured under normal conditions product the following results:

|                          | Values       |               |
| ------------------------ | ------------ | ------------- |
|                          | After 7 Days | After 28 Days |
| Tensile strength kg/cm$^2$ | 2.7          | 11.3          |
| Compression strength     | 5.7          | 25            |
| Rockwell hardness        | broken       | broken        |

Fluidification of this anhydrite does not take place. When determining the proportions of the cake which subsequently sets, it is found that the quantity of gypsum is only 15.4%. This product which has no value as a bonding agent has a very low reactivity vis-a-vis, rehydration.

EXAMPLE 3

The anhydrite prepared as described in Example 2 by calcining phosphogypsum in a rotary furnace is supplied to a pin mill equipped with 0.1 millimeter grid.

The ground product is characterized by its Blaine surface which reaches 7.255 cm$^2$/g and by its granulometry, of which the characteristic values of the particles are as follows:

Average diameter: 7 microns
20% by weight: larger than 16 microns
20% by weight: less than 2.7 microns This anhydrite has a water content at normal consistency of 23.5%. When mixed with 1% $K_2SO_4$ and 1% $Ca(OH)_2$ it begins to set after 20 minutes and setting is terminated after 38 minutes.

The cake produced has excellent mechanical properties. Rockwell hardness is 96.6 after 7 days and, finally, 97.2 after 28 days.

Unfortunately, this product cannot be fluidified with the fluidifying resin descirbed in U.S. application Ser. No. 621,353. Neither can it be fluidified with any other product.

This limits the number of uses for this anhydrite.

EXAMPLE 4

The same anhydrite obtained by calcination in a rotary furnace is supplied to a ball mill. It remains in the mill for 47 hours. At the end of the 47 hours, a powder having the following characteristics is obtained:

Blaine surface: approximately 2500 cm$^2$/g
Average diameter: 19 microns
20% by weight: larger than 51 microns
20% by weight: less than 7.4 microns The water required at normal consistency is 23%. The setting of the product mixed with 1% $K_2SO_4$ and 1% $Ca(OH)_2$ is measured with a Vicat needle. Setting begins 40 minutes after mixing and is terminated 20 minutes later.

The mechanical resistances of the products are as follows:

| Mechanical Properties of the | Values       |               |
| ---------------------------- | ------------ | ------------- |
| Pure Paste                   | After 7 Days | After 28 Days |
| Tensile strength kg/cm$^2$     | 61           | 84            |
| Compression strength kg/cm$^2$ | 268          | 510           |
| Rockwell Hardness            | 91           | 94            |

Moreover, when this anhydrite is mixed with 25% water in the presence of 1% fluidifying resins as described in U.S. application Serial No. 621,353, a paste is obtained whose fluidity is 34 kg/hxcm$^2$.

With the same activators, $K_2SO_4$ and $Ca(OH)_2$, this paste sets 1 hour and 15 minutes to 1 hour and 45 minutes after mixing. The mechanical resistance values of the product are now the following:

| Mechanical Properties with Added | Values       |               |
| -------------------------------- | ------------ | ------------- |
| Fluidifying Agent                | After 7 Days | After 28 Days |
| Tensile strength kg/cm$^2$         | 62           | 102           |
| Compression strength kg/cm$^2$     | 277          | 578           |
| Rockwell Hardness                | 87           | 91            |

This product is suitable for multiple bonding uses.

EXAMPLE 5

Phosphogysum of the type described in Example 1 is deposited on trays in a layer of approximately 2 cm. thickness. The trays are placed in a vertical electric furnace. The product is subjected to a thermal treatment of 2 hours duration. This treatment consists in rapidly raising the temperature to 721° C. followed by isothermic heating at this temperature for 38 minutes.

The anhydrite obtained is characterized by its porosity which is measured by mercury penetration. The pore volume of this product is 0.294 cc/g in the case of pores having a radius smaller than 6.6 microns. The product is then ground in a ball mill for 20 hours until it has the following particle granulometry:

average diameter: 18 microns
20% by weight: larger than 49 microns
20% by weight: smaller than 7.9 microns
Blaine surface: 6338 cm$^2$/g This product has a water content at normal consistency of 39%.

As the mechanical properties decline rapidly according to the proportion of water in the paste, the anhydrite calcined in the above manner at 721° C. has bonding agent properties which may be considered inadequate for certain uses.

EXAMPLE 6

The phosphogypsum is treated in the same apparatus as used in the preceding example so as to rapidly reach the temperature of 950° C. The product is kept at this temperature for ½ hour. The thermal treatment takes a total of 2 hours.

The calcined product has a pore volume of 0.07 cc/g in the case of pores having a radius smaller than 6.6 microns.

The product is placed in a ball mill and ground for 44 hours. Upon termination of this operation, the anhydrite has a Blaine surface of approximately 3000 cm$^2$/g and its granulometry is characterized by the following:

an average diameter of: 18 microns
20% by weight: larger than 51 microns
20% by weight: smaller than 7.7 microns This ground product also has a pore volume of pores with radii smaller than 6.6 microns of 0.18 cc/g.

This anhydrite only requires 20% water for mixing at normal consistency.

The setting process, in the presence of 1% $K_2SO_4$ and 1% $Ca(OH)_2$, begins 1 hour and 20 minutes after commencing mixing and is terminated after 2 hours and 10 minutes.

The cake thereby obtained has a Rockwell hardness after 7 days of 98. In the fluidification tests, a fluidity of 30 kg/hxcm$^2$ can be obtained with this anhydrite with 1% resin when it is mixed with only 22% water.

The fluidified anhydrite sets and reaches a hardness after 7 days of 95.2. Accordingly, this represents a cement product of excellent quality.

While the invention has been described in connection with the preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. An anhydrite binder consisting essentially of particulate anhydrous $CaSO_4$ having an insoluble $CaSO_4$ content of at least 93%, an average particle size diameter of 5 to 30$\mu$ with at least 15% by weight of the particles having a diameter smaller than 10$\mu$ and at least 20% by weight of the particles having a diameter larger than 20$\mu$, and a pore volume of less than 0.29 cc/g for pores having a radius less than about 6.6$\mu$.

2. An anhydrite bonding agent comprising the anhydrite binder of claim 1 and from 0.5 to 4% by weight, based on the weight of the anhydrite, of an activator capable of increasing rehydration of the anhydrite while retaining mixing water substantially long to prevent it from evaporating before sufficient hydration of the anhydrite.

3. The bonding agent of claim 2 wherein the activator is selected from alkali metal sulfate, alkaline earth metal oxides and hydroxides, alkali metal silicates, or mixtures thereof.

4. The bonding agent of claim 3 wherein the activator is a mixture of equal parts by weight of $K_2SO_4$ and $Ca(OH)_2$.

5. A process for preparing the anhydrite binder of claim 1 consisting essentially of sequentially calcining the phosphogypsum by-products derived from the production of phosphoric acid by the wet method at a temperature of between about 450° to 12,000° C. for a time sufficient to produce a calcined granulated product having a pore volume of less than 0.25 cc/g for pores having a radius smaller than 6.6$\mu$ and a granulometry which corresponds to at least the granulometry of said starting phosphogypsum, grinding said calcined product under conditions and for a time sufficient to obtain a product having a particle granulometry such that at least 15% by weight of the particles have a diameter smaller than 10$\mu$, at least 20% by weight of the particles have a diameter larger than 20$\mu$, and the average diameter is between 5 to 30$\mu$, and recovering the anhydrite binder.

6. The process of claim 5 wherein the calcining temperature is from about 800° to 1,100° C.

7. The process of claim 6 wherein the calcining is carried out for a period of 1 to 2 hours in a rotating furnace.

* * * * *

UNITED STATES PATENT AND TRADEMARK OFFICE
CERTIFICATE OF CORRECTION

PATENT NO. : 4,151,000
DATED : April 24, 1979
INVENTOR(S) : Roland Bachelard, et al.

It is certified that error appears in the above-identified patent and that said Letters Patent are hereby corrected as shown below:

The Abstract, line 7, reads "30", should read --30μ--

Column 1, line 60, reads "fluoropatitic", should read --fluoroapatitic--

Column 2, line 20, reads "0.4-0.6&", should read --0.4-0.6%--

Column 3, line 61, reads "fulfonated", should read --sulfonated--

Column 8, line 14, reads "Phosphogysum", should read --Phosphogypsum--

Signed and Sealed this

Sixteenth Day of October 1979

[SEAL]

Attest:

RUTH C. MASON
Attesting Officer

LUTRELLE F. PARKER
Acting Commissioner of Patents and Trademarks